(12) United States Patent
Akcakaya et al.

(10) Patent No.: US 8,699,773 B2
(45) Date of Patent: Apr. 15, 2014

(54) METHOD FOR IMAGE RECONSTRUCTION USING LOW-DIMENSIONAL-STRUCTURE SELF-LEARNING AND THRESHOLDING

(75) Inventors: Mehmet Akcakaya, Cambridge, MA (US); Reza Nezafat, Newton, MA (US)

(73) Assignee: Beth Israel Deaconess Medical Center, Boston, MA (US)

( * ) Notice: Subject to any disclaimer, the term of this patent is extended or adjusted under 35 U.S.C. 154(b) by 387 days.

(21) Appl. No.: 12/909,313

(22) Filed: Oct. 21, 2010

(65) Prior Publication Data

US 2012/0099774 A1 Apr. 26, 2012

(51) Int. Cl.
*G06K 9/00* (2006.01)
(52) U.S. Cl.
USPC .......................................................... 382/131
(58) Field of Classification Search
USPC .......................................................... 382/131
See application file for complete search history.

(56) References Cited

U.S. PATENT DOCUMENTS

| 7,289,049 | B1 | 10/2007 | Fudge et al. | |
|---|---|---|---|---|
| 7,646,924 | B2 | 1/2010 | Donoho | |
| 8,472,688 | B2 * | 6/2013 | Samsonov et al. | 382/130 |
| 2007/0010731 | A1 * | 1/2007 | Mistretta | 600/407 |

OTHER PUBLICATIONS

Ganesh, Arvind et al, Fast Algorithms for Recovering a Corrupted Low-Rank Matrix, Dec. 2009, 2009 3rd IEEE International Workshop on Computational Advances in Multi-Sensor Adaptive Processing, pp. 1-4.*

Jiayu Song, Qing H. Liu, G. Allan Johnson, and Cristian T. Badea, "Sparseness prior based iterative image reconstruction for retrospectively gated cardiac micro-CT", Med. Phys. 34, 4476 (2007).*
PCT International Search Report, PCT/US2011/056316, Jan. 30, 2012.
Akcakaya, et al., Low-Dimensional-Structure Self-Learning and Thresholding: Regularization Beyond Compressed Sensing for MRI Reconstruction, Magnetic Resonance in Medicine, 2011, 66:756-767.
Buades, et al., Image Denoising Methods. A New Nonlocal Principle, SIAM Review, 2010, 52(1):113-147.
Coupe, et al., An Optimized Blockwise Nonlocal Means Denoising Filter for 3-D Magnetic Resonance Images, IEEE Trans Med Imaging, 2008, 27(4):425-441.
Ji, et al., Robust Video Denoising Using Low Rank Matrix Completion, 2010 IEEE Conference on Computer Vision and Pattern Recognition (CVPR), Jun. 13-18, 2010, San Francisco, CA, USA, 8 pages.

(Continued)

*Primary Examiner* — Utpal Shah
(74) *Attorney, Agent, or Firm* — Quarles & Brady, LLP (57) ABSTRACT

A method for reconstructing an image of a subject from undersampled image data that is acquired with an imaging system, such as a magnetic resonance imaging system or computed tomography system, is provided. From the acquired undersampled image data, an image of the subject is reconstructed and used to guide further image reconstruction. For example, a low resolution image is reconstructed from a portion of the undersampled image data, such as from a portion corresponding to the center of k-space when MRI is used. From this image, a number of similarity clusters are produced and processed. The processing may be by hard thresholding, Wiener filtering, principal component pursuit, or other similar techniques. These processed similarity clusters are then used to reconstruct a final, target image of the subject using, for example, a weighted average combination of the similarity clusters.

14 Claims, 6 Drawing Sheets

(56) References Cited

OTHER PUBLICATIONS

Bilgin, et al., Dictionary Design for Compressed Sensing MRI, May 2010, Stockholm, Proceedings of the 18th Scientific Meeting of ISMRM, p. 4887.

Candes, et al., Robust Uncertainty Principles: Exact Signal Reconstruction from Highly Incomplete Frequency Information, IEEE Transactions on Information Theory, 2006, 52(2):489-509.

Candes, et al., Exact Matrix Completion Via Convex Optimization, Foundations of Computational Mathematics, 2009, 9:717-772.

Dabov, et al., Image Denoising by Sparse 3-D Transform-Domain Collaborative Filtering, IEEE Transactions on Image Processing, 2007, 16(8):2080-2095.

Doneva, et al., Compressed Sensing Reconstruction for Magnetic Resonance Parameter Mapping, Magnetic Resonance in Medicine, 2010, 64:1114-1120.

Donoho, et al., Data Compression and Harmonic Analysis, IEEE Transactions on Information Theory, 1998, 44(6):2435-2476.

Donoho, Compressed Sensing, IEEE Transactions on Information Theory, 2006, 52(4):1289-1306.

Elad, et al., Image Denoising Via Sparse and Redundant Representations Over Learned Dictionaries, IEEE Transactions on Image Processing, 2006, 15(12):3736-3745.

Figueiredo, et al., An EM Algorithm for Wavelet-Based Image Restoration, IEEE Transactions on Image Processing, 2003, 12(8):906-916.

Fischer, et al., A Combination of Nonconvex Compressed Sensing and GRAPPA (CS-GRAPPA), 2009, Proc. Intl. Soc. Mag. Reson. Med. 17, p. 2813.

Foi, et al., Pointwise Shape-Adaptive DCT for High-Quality Denoising and Deblocking of Grayscale and Color Images, IEEE Transactions on Image Processing, 2007, 16(5):1395-1411.

Gamper, et al., Compressed Sensing in Dynamic MRI, Magnetic Resonance in Medicine, 2008, 59:365-373.

Liang, et al., Accelerating SENSE Using Compressed Sensing, Magnetic Resonance in Medicine, 2009, 62:1574-1584.

Lustig, et al., Sparse MRI: The Application of Compressed Sensing for Rapid MR Imaging, Magnetic Resonance in Medicine, 2007, 58:1182-1195.

Lustig, et al., SPIRiT: Iterative Self-Consistent Parallel Imaging Reconstruction from Arbitrary k-Space, Magnetic Resonance in Medicine, 2010, 64:457-471.

Otazo, et al., Adaptive Compressed Sensing MRI, May 2010, Stockholm, Proceedings of the 18th Scientific Meeting of ISMRM, p. 4867.

Otazo, et al., Combination of Compressed Sensing and Parallel Imaging for Highly Accelerated First-Pass Cardiac Perfusion MRI, Magnetic Resonance in Medicine, 2010, 64:767-776.

Pluim, et al., Mutual-Information-Based Registration of Medical Images: A Survey, IEEE Transactions on Medical Imaging, 2003, 22(8):986-1004.

Vasanawala, et al., Improved Pediatric MR Imaging with Compressed Sensing, Radiology, 2010, 256(2):607-616.

Zhou, et al., Stable Principal Component Pursuit, ISIT 2010, Austin Texas, U.S.A., Jun. 13-18, 2010, Proceedings of the IEEE International Symposium on Information Theory, pp. 1518-1522.

\* cited by examiner

METHOD FOR IMAGE RECONSTRUCTION USING LOW-DIMENSIONAL-STRUCTURE SELF-LEARNING AND THRESHOLDING

STATEMENT REGARDING FEDERALLY SPONSORED RESEARCH

This invention was made with United States government support awarded by the following agency: National Institutes of Health, NIH EB008743. The United States government has certain rights in this invention.

FIELD OF THE INVENTION

The field of the invention is methods and systems for imaging, including medical imaging. More particularly, the field of the invention relates to methods and systems for image reconstruction, including reconstruction of medical images such as magnetic resonance or x-ray computed tomography images.

BACKGROUND OF THE INVENTION

Accelerated magnetic resonance imaging ("MRI") acquisition techniques such as partial Fourier, non-Cartesian, parallel imaging, and time-frequency acquisitions have been widely studied over the past few decades. Partial Fourier methods use phase information to reduce scan time. Non-Cartesian sampling techniques rely on more efficient k-space transversals and have incoherent or less visually significant artifacts compared to Cartesian sampling. The local sensitivity of phased-array coil elements are used in parallel imaging either in k-space, such as with SMASH and GRAPPA, or image space, such as with SENSE, to allow accelerated data acquisition. In dynamic MRI, such as perfusion or cine imaging, time-frequency approaches such as k-t SENSE, UNFOLD, and TSENSE have been used to accelerate data acquisition by exploiting spatiotemporal information. Despite all these efforts, long scan time is still a main challenge for MRI, especially in cardiac imaging where alternative modalities such as multi-detector CT benefit from rapid acquisition and high patient throughput.

Compressed, or compressive, sensing ("CS") is a recently developed image reconstruction technique that is applicable for randomly sampled k-space data. This technique exploits the sparsity, or more generally compressibility, of the target image in a transform domain to provide for accelerated data acquisitions. Moreover, CS techniques may be used to surpass the current rapid acquisition techniques in terms of acceleration rate. CS techniques have already been applied in several cardiac applications to reduce scan time, which can be traded off for higher spatial or temporal resolution. CS has also been used in pediatric imaging, non-contrast-enhanced peripheral angiography, three-dimensional upper airway imaging, and hyperpolarized carbon-13 MR spectroscopy. Furthermore, attempts have been made to combine parallel imaging and CS, via sparsity-regularized iterative GRAPPA-type approaches, a concurrent combination of CS and SENSE where the coil sensitivities are used to enforce data consistency in addition to sparsity constraints, and a serial combination of CS and SENSE.

CS reconstruction techniques generally aim to minimize the sparsity of a target image in a transform domain subject to data consistency constraints that compare an image estimate to the acquired k-space data. Minimization of the number of non-zero coefficients, which is a direct measure of sparsity, is NP-hard in general. Thus, alternative measures, such as the $l_1$-norm of the transform domain coefficients have been proposed instead.

Minimization of the convex $l_1$-norm of transform domain coefficients has also been the preferred CS sparsity regularization in MRI for all the aforementioned applications. This technique assumes that an image has a sufficiently sparse representation in a pre-selected transform domain. Although sparsity is a necessary condition for $l_1$-norm reconstruction, it is extremely difficult to know whether a transform can efficiently represent the underlying target image characteristics. For instance, wavelets cannot capture smooth transitions sparsely, whereas finite differences have problems with sharp edges. Thus, minimization of sparsity with a fixed transform domain may result in blurring and other image artifacts. Even if the transform dictionary is generated using the computationally expensive dictionary learning algorithms, the effectiveness of such transforms may degrade due to inter and intra-patient variability, especially for cardiac MRI where contrast and signal levels vary significantly between different acquisitions. Furthermore, such techniques fail to provide a reconstruction strategy that can be applied to various different anatomical features without the need for training data or prior assumption about underlying features. Moreover, since no local information is used, these methods are generally not robust to estimation errors in coil sensitivity maps.

It would therefore be desirable to provide a method for magnetic resonance image reconstruction that includes the scan time reduction benefits of CS techniques, but that is robust to inter- and intra-patient variabilities without the need for separately acquired training data.

SUMMARY OF THE INVENTION

The present invention overcomes the aforementioned drawbacks by providing a method for image reconstruction that utilizes a priori information available from, for example, a low resolution image reconstructed from a portion of an acquired image data set. An improved compressed sensing reconstruction method is provided for the reconstruction of target images from undersampled image data. The method uses the structure and anatomical features in the target image being reconstructed to improve the reconstruction. By using the information from the target image itself, various features of the image can be sparsely represented in an adaptive fashion, without the need for training data. Once such an adaptive representation is achieved, aliasing artifacts and noise can be removed from the target image. Furthermore, learning the structure in this self-contained manner provides robustness to variations among patients, exams, and contrast levels.

It is an aspect of the invention to provide a method for reconstructing an image of a subject from undersampled image data that is acquired with an imaging system, such as a magnetic resonance imaging ("MRI") system or an x-ray computed tomography system. From the acquired undersampled image data, an image of the subject is reconstructed. For example, a low resolution image is reconstructed from a portion of the undersampled image data, such as from a portion corresponding to the center of k-space when MRI is used. Alternatively, an estimate image is produced using, for example, a parallel MRI, or conventional CS reconstruction technique. From this image, a number of similarity clusters are produced and processed. These processed similarity clusters are then used to reconstruct a final, target image of the subject using, for example, a weighted average combination of the similarity clusters.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

An improved method for reconstructing images from undersampled image data, such as k-space data acquired with a magnetic resonance imaging ("MRI") system; x-ray projection data acquired with an x-ray imaging system, such as a computed tomography ("CT") system; or the like, is provided. The method is generally referred to as "low-dimensional-structure self-learning and thresholding" ("LOST"), and utilizes structure from an underlying image to improve the reconstruction process. Generally, a low resolution image from a substantially fully-sampled portion of the image data, such as the central portion of k-space, is reconstructed, from which image blocks containing similar image characteristics, such as anatomical characteristics, are identified. These image blocks are arranged into "similarity clusters," which are subsequently processed for de-aliasing and artifact removal using underlying low-dimensional properties. Alternatively, other methods can be implemented to reconstruct an estimate image, from which similarity clusters are identified.

For example, the similarity clusters are arranged into a three-dimensional ("3D") structure and processed using, for example, a 3D Fourier transform, which yields high levels of sparsity due to the similarity of the image blocks. It is noted that other transforms, such as a wavelet transform, can similarly be employed, as can combinations of more than one transform. As an example of the latter, a wavelet transform can be performed along two dimensions and a Fourier transform applied along a third. In the alternative, each image block in the similarity cluster can be vectorized and arranged into a matrix that has low-rank properties, that is, the matrix can be represented with minimal error using a small number of singular values and vectors. Both of these properties are low-dimensional because if a high-dimensional dataset has one of these properties, it can be approximated with high fidelity using parameters, such as transform domain coefficients or singular values and vectors, that have a total number much less than the dimensionality of the matrix.

Each similarity cluster is highly likely to fit to a low-dimensional signal model, which allows artifacts due to undersampling and noise to be represented as perturbations to the low-dimensional structure. This characteristic of the artifacts facilitates further processing, as well as preserving information locally. The similarity clusters are non-linearly thresholded based on their low-dimensional properties in order to remove the perturbations caused by aliasing and artifacts.

Figure 1:
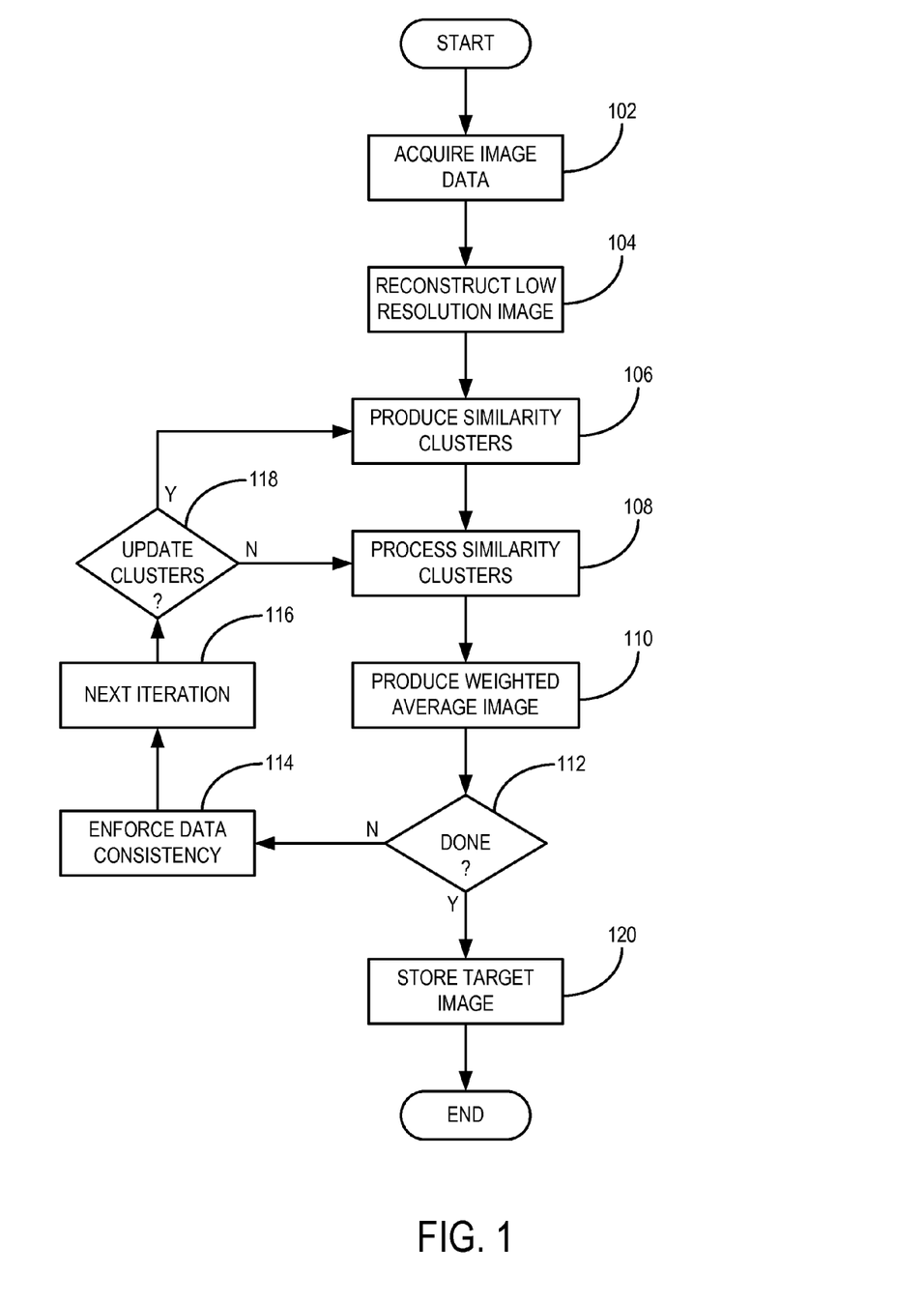
FIG. 1 is a flowchart setting forth the steps of an exemplary method for reconstructing images using a low-dimensional-structure self-learning and thresholding ("LOST") technique.

Referring now to FIG. 1, a flowchart setting forth the steps of an exemplary method for reconstructing images using a low-dimensional-structure self-learning and thresholding ("LOST") method is illustrated. The method begins with the acquisition of image data, as indicated at step 102. This data acquisition may sample data consistent with the Nyquist criterion, or may undersample data in violation of the Nyquist criterion. When the data acquisition results in undersampled image data, it is beneficial that sufficient data be acquired to produce a substantially artifact-free, low-resolution image of the object being imaged. For example, when magnetic resonance imaging ("MRI") is employed to acquire undersampled image data, it is beneficial that the data acquisition sample a central portion of k-space in agreement with the Nyquist criterion, while undersampling the peripheral portions of k-space in which higher spatial frequencies are located.

After the image data has been acquired, the method proceeds with the reconstruction of a low resolution image from the image data, as indicated at step 104. This image reconstruction may include the application of a Hann function to window the image data before performing a Fourier transform-based image reconstruction. The application of a Hann function results in an image with low aliasing artifacts, but a decrease in spatial resolution. From this low resolution image, a plurality of similarity clusters are produced, as indicated at step 106. Such similarity clusters includes image blocks that contain similar information, such as anatomical content in medical imaging applications.

Figure 2:
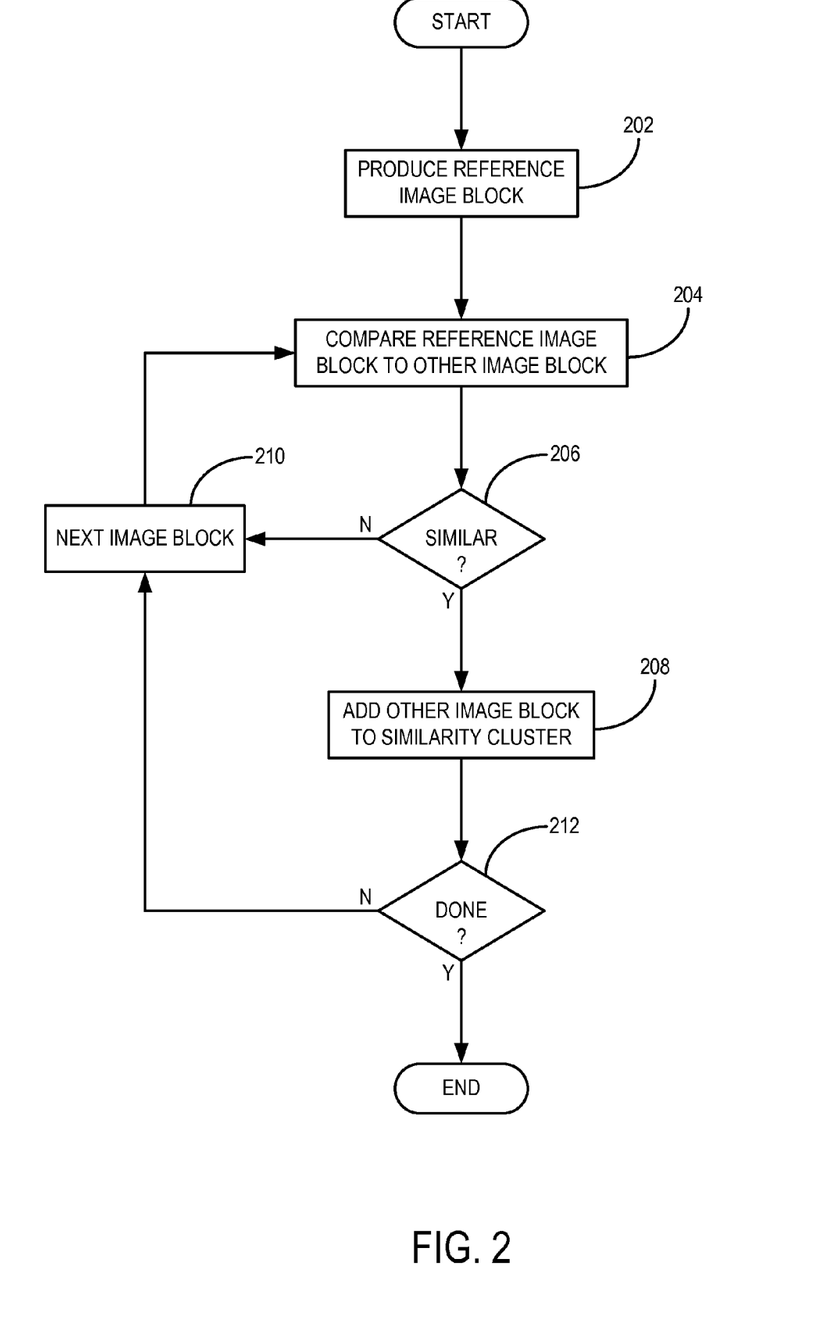
FIG. 2 is a flowchart setting forth the steps of an exemplary block matching method employed in the method of FIG. 1.

By way of one example, the similarity clusters are produced using a block matching technique. Referring particularly now to FIG. 2, a flowchart setting forth the steps of an exemplary block matching method is illustrated. Such a method begins with the definition of a reference block, $X_{ref}$, to which other image blocks, $X$, will be matched, as indicated at step 202. While a two-dimensional implementation is described below, it will be appreciated by those skilled in the art that three-dimensional block matching techniques can similarly be implemented. In addition, shape-adaptive approaches in which the block shape changes based on its location can also be implemented.

For a voxel at location $(x_0, y_0, z_0)$, an $N_b \times N_b$ reference image block, $X_{ref}$, whose top left corner is at the voxel location $(x_0, y_0, z_0)$, can be defined as:

$$X_{ref} = \{m(x,y,z) : x_0 \leq x \leq x + N_b - 1, y_0 \leq y \leq y_0 + N_b - 1, z = z_0\} \quad (1).$$

This reference image block, $X_{ref}$, is compared to other $N_b \times N_b$ image blocks, $X$, using, for example, a normalized $l_2$ distance measure given by:

$$d(X_{ref}, X) = \frac{\|X_{ref} - X\|_2^2}{\|X_{ref}\|_2^2}; \quad (2)$$

as indicated at step 204. When this distance measure, $d(X_{ref}, X)$, is less than a specified threshold, $\lambda_{match}$, the two blocks are considered similar, as indicated at decision block 206, and the image block, X, is added to the similarity cluster of the reference image block, $X_{ref}$, as indicated at step 208, or equivalently to the similarity cluster of the voxel location, $(x_0,y_0,z_0)$. If the selected image block, X, is considered not similar to the reference image block, $X_{ref}$, then a next image block, X, is selected at step 210 and compared to the reference image block, $X_{ref}$, as described above. Likewise, if the selected image block, X, is considered similar to the reference image block, $X_{ref}$, and added to the similarity cluster, then a next image block, X, is selected at step 210 and compared to the reference image block, $X_{ref}$, as described above until all of the image blocks, X, have been compared to the reference image block, $X_{ref}$, as determined at decision block 212.

While it is possible to search across the whole image for similar blocks, such an approach is demanding from a computational perspective. Therefore, it may be advantageous that, for any given voxel, only two-dimensional ("2D") blocks within a specified search radius are compared to the reference image block, $X_{ref}$. For example, if the other image block, X, has a top left corner located at the voxel location $(x_1,y_1,z_1)$, then the image block, X, is compared to the reference image block, $X_{ref}$, only when the following conditions hold:

$$x_0 - N_{search} \leq x_1 \leq x_0 + N_{search} \quad (3);$$

$$y_0 - N_{search} \leq y_1 \leq y_0 + N_{search} \quad (4);$$

and $$z_0 - N_{depth} \leq z_1 \leq z_0 + N_{depth} \quad (5);$$

Furthermore, the size of each cluster may be limited to be $N_{cluster}$ to further improve computational efficiency. Thus, if more than $N_{cluster}$ image blocks are matched to the reference image block, only those blocks with the highest degree of similarity in the cluster are considered for further processing.

Referring again to FIG. 1, after the similarity clusters have been produced, they are processed to remove contributions from imaging artifacts resulting from aliasing and noise, as indicated at step 108. As mentioned above, the processing of the similarity clusters can proceed in at least two different manners: one based on the transform domain characteristics of the similarity clusters and the other based on the low-rank characteristics of the similarity clusters. Each of these exemplary processing techniques will be described below in detail.

Figure 3:
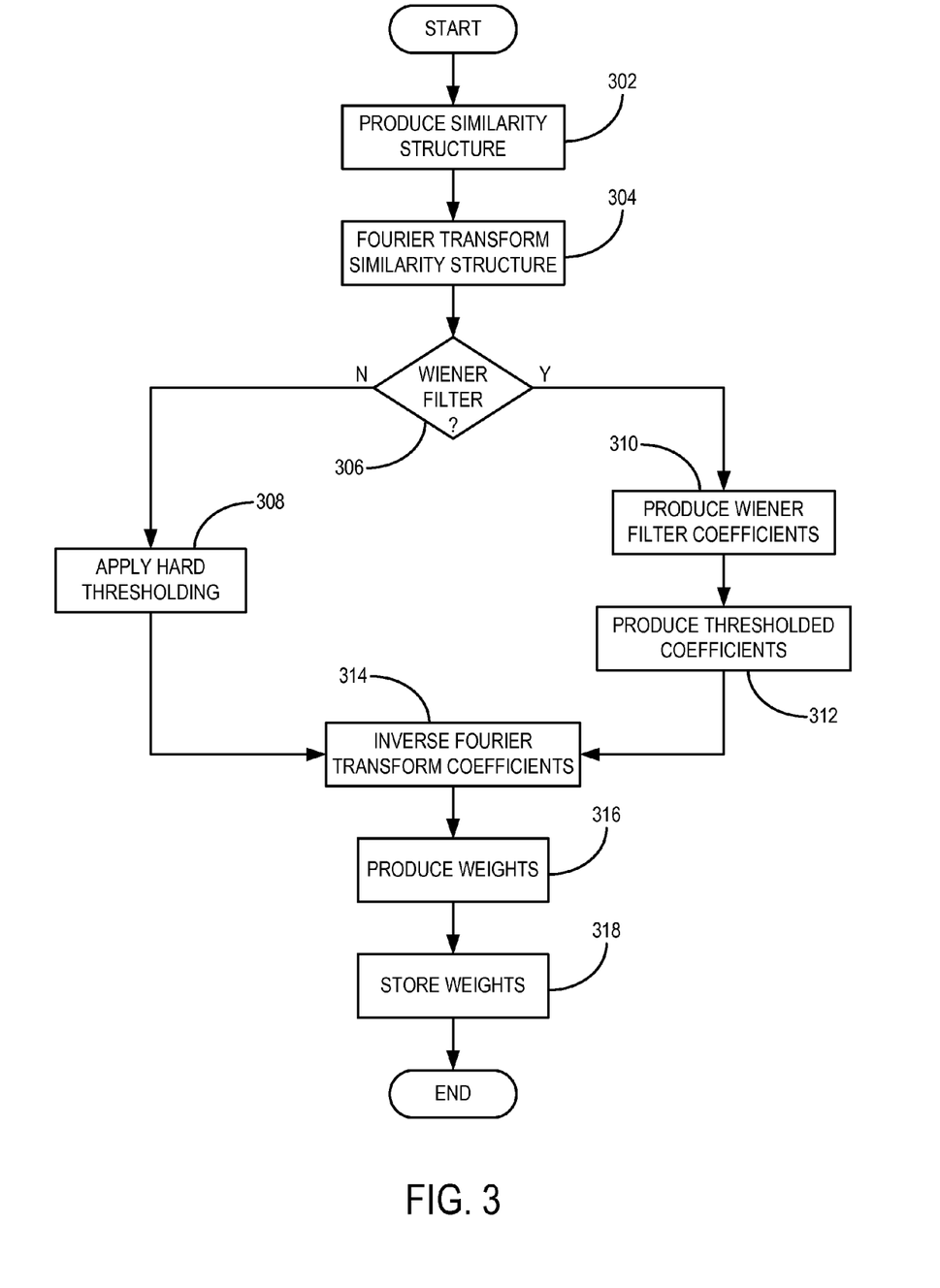
FIG. 3 is a flowchart setting forth the steps of an exemplary method for processing similarity clusters using transform domain characteristics of the similarity clusters.

Referring particularly now to FIG. 3, a flowchart setting forth the steps of an exemplary method for LOST de-aliasing using the transform domain characteristics of the similarity clusters is illustrated. In this LOST de-aliasing technique, the transform-domain sparsity of the similarity clusters is used to threshold aliasing and noise artifacts. This approach begins with the production of a three-dimensional similarity structure, as indicated at step 302. This similarity structure is composed of the two-dimensional similarity clusters, arranged, such as by stacking, in a three-dimensional matrix. This similarity structure is then Fourier transformed to produce transform coefficients, as indicated at step 304. For example, for each voxel location, $(x_n,y_n,z_n)$, a three-dimensional fast Fourier transform ("FFT") is applied to the similarity structure at that selected voxel location, $(x_n,y_n,z_n)$, which is denoted by $\Lambda_n$. While the Fourier transform is presented as one example of a transform that can be used to process the similarity clusters based on their transform domain characteristics, here their Fourier domain characteristics, it will be appreciated by those skilled in the art that other transforms can similarly be applied. For example, a wavelet transform can be used.

A decision is made at decision block 306 whether hard thresholding or Wiener filtering will be applied to the transform coefficients, $F_n$. It will be appreciated by those skilled in the art that thresholding techniques other than hard thresholding and Wiener filtering can similarly be implemented. For example, a reweighted least squares approach may be used instead of a Wiener filter, or $l_p$ soft-thresholding may be used instead of hard thresholding. In the initial iterations of the overall image reconstruction, it is advantageous to perform hard thresholding, which is similar in effect to capturing the $l_0$-norm of the transform coefficients, $F_n$, as indicated at step 308. This hard thresholding mitigates aliasing artifacts. Hard thresholding is performed by setting those transform coefficients, $F_n$, having a magnitude below a threshold value, $\tau_{ht}$, to zero, while preserving those transform coefficients, $F_n$, having a magnitude above the threshold value, $\tau_{ht}$. Thus:

$$\hat{F}_n = \begin{cases} F_n & |F_n| \geq \tau_{ht} \\ 0 & |F_n| < \tau_{ht}; \end{cases} \quad (6)$$

where $\hat{F}_n$, are the thresholded coefficients. In subsequent iterations it may be beneficial to apply Wiener filtering to the transform coefficients, $F_n$, instead of hard thresholding, as indicated at step 310. This Wiener filtering mitigates blurring artifacts. In Wiener filtering, the filter coefficients for the location, $(i,j,k)$, in the transform domain are generated from the current estimate by:

$$W_n(i,j,k) = \frac{|F_n(i,j,k)|^2}{|F_n(i,j,k)|^2 + \tau_{wie}^2}; \quad (7)$$

where $\tau_{wie}$ is a Wiener filtering threshold value. These filter coefficients, $W_n$, and the transform coefficients, $F_n$, are multiplied point-wise to generate thresholded coefficients, $\hat{F}_n$, as indicated at step 312.

Whether hard thresholding or Wiener filtering is employed, the resultant thresholded coefficients are transformed back to the image domain, for example, via inverse FFT, to produce the processed similarity clusters, as indicated at step 314. The described filtering process is repeated for each similarity cluster, and because the clusters are not necessarily disjoint, there will be multiple thresholded estimates for the two-dimensional image blocks. Weighting values are generated based on the thresholding technique utilized, as indicated at step 316. However, it should be appreciated that weighting values can also be selected arbitrarily with respect to the thresholding technique used; thus, other weighting values that those expressly mentioned below may also be used. Subsequently, these weighting values are employed to produce a weighted average image from the processed similarity clusters, as will be described below. The weighting values are generated for each cluster. If hard thresholding is used, the weighting values may be generated based on the number of nonzero coefficients, $N_n$, remaining after thresholding. Thus, the weighting values are given by:

$$w_n^{ht} = \begin{cases} \frac{1}{N_n} & N_n \geq 1 \\ 1 & N_n = 0. \end{cases} \quad (8)$$

When Wiener filtering is utilized, the weighting values may be generated using:

$$w_n^{wie} = \frac{1}{\sum_{i,j,k} |W_n(i,j,k)|^2}. \quad (9)$$

As discussed above, these weighting values are subsequently used to produce a weighted average image; thus, they are stored for later use, as indicated at step 318.

Figure 4:
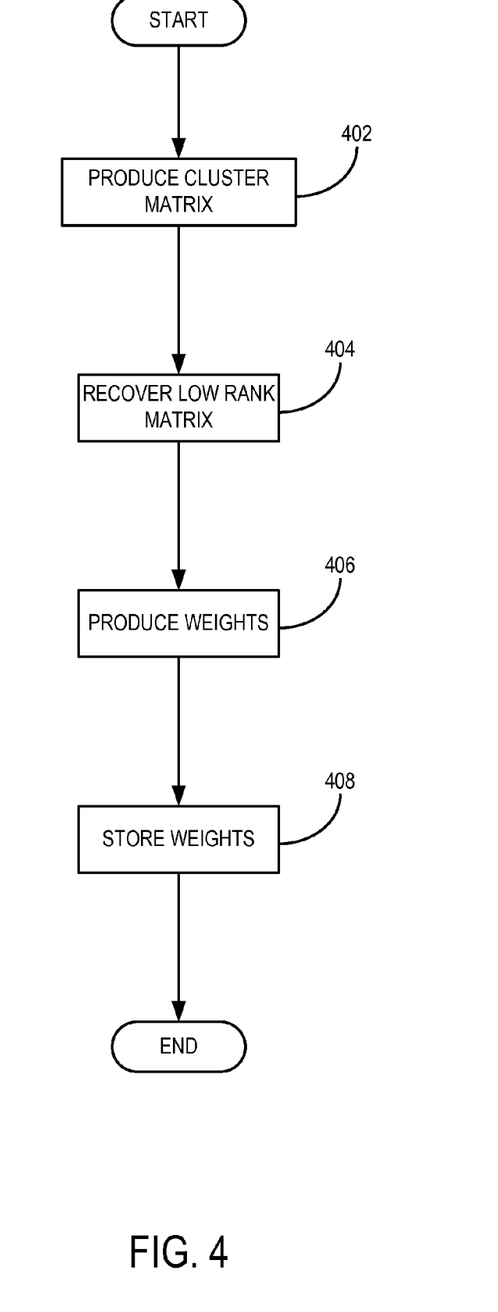
FIG. 4 is a flowchart setting forth the steps of an exemplary method for processing similarity clusters using a low-rank matrix technique.

Referring now particularly to FIG. 4, a flowchart setting forth the steps of a method for LOST de-aliasing using the low rank matrix characteristics of the similarity clusters is illustrated. Low-rank properties of matrices have been an active area of recent research, with applications in low-rank matrix completion from incomplete measurements and robust principal component analysis ("PCA") techniques. To utilize low-rankedness of clusters, each $N_b \times N_b$ image block in the similarity clusters is rearranged into an $N_b^2 \times 1$ vector, and these vectors are treated as the columns of a matrix describing the cluster. Since the data in each image block has similar anatomical features, the matrix can be well-approximated by a low-rank matrix. By way of example, if all the image blocks had the same signal content, then the matrix would have rank one.

Thus, the method begins with the generation of a cluster matrix, $M_\Lambda$, as indicated at step 402. To utilize the low-rank properties of the cluster, $\Lambda_n$, the cluster matrix, $M_{79}$, is produced by rearranging the image blocks in the similarity clusters, $\Lambda_n$, to column vectors. As discussed above, this is achieved by rearranging each $N_b \times N_b$ image block in the similarity clusters into an $N_b^2 \times 1$ vector, each of which is treated as the column of the cluster matrix, $M_\Lambda$. By the low-rank properties of the similarity clusters, the cluster matrix, $M_\Lambda$, can be well approximated by a low rank matrix, $L_\Lambda$, corrupted by artifacts and noise. Classical PCA seeks to find the best rank-k matrix that approximates the cluster matrix, $M_\Lambda$, in the $l_2$ sense. While this is advantageous in the presence of Gaussian noise, PCA is not robust to gross and non-Gaussian errors caused by artifacts and noise. Thus, a more robust version of PCA, denoted principal component pursuit ("PCP") is advantageous. Here the noise and artifacts are modeled as a sum of gross errors, $E_\Lambda$, and small errors, $Z_\Lambda$, resulting in the model:

$$M_\Lambda = L_\Lambda + E_\Lambda + Z_\Lambda \tag{10}.$$

The low rank matrix, $L_\Lambda$, can be recovered using a convex relaxation of rank minimization, as indicated at step 404. This is achieved, for example, by iteratively minimizing the following objective function:

$$\min_{L,E} \{ \|L\|_* + \lambda_{pcp} \|E\|_1 + \mu_{pcp} \|M_\Lambda - (L+E)\|_F^2 \}; \tag{11}$$

where $\| \ldots \|_*$ indicates the nuclear norm of a matrix, which is a sum of the absolute values of the singular values of the matrix; $\| \ldots \|_1$ indicates the $l_1$-norm of a matrix, which is a sum of the absolute values of the entries in the matrix; $\| \ldots \|_F^2$ indicates the squared Frobenius norm of a matrix, which is a sum of the magnitude-squares of the entries in the matrix; and $\lambda_{pcp}$ and $\mu_{pcp}$ are optimization weighting values. This minimization can be solved using iterative approaches; however, this results in a complexity of $O(\max(N_b^2, N_{cluster})^6)$ per voxel. It is contemplated that a graphics processing unit ("GPU") implementation will enable a more efficient use of this technique, which is attractive since it can resolve non-Gaussian artifacts. It will be appreciated by those skilled in the art that thresholding techniques other than robust PCA may also be used. For example, classical PCA or matrix completion approaches may yield satisfactory results in certain applications.

As with the transform domain approach to processing the similarity clusters, weighting values are produced for a weighted average, as indicated at step 406. When this low rank matrix processing is employed, these weighting values may be assigned, for example, as:

$$w_n^{pcp} = 1 \tag{12}.$$

These weighting values are then stored for subsequent use, as indicated at step 408.

Referring again particularly to FIG. 1, the processed similarity clusters are combined to form a final image estimate using, for example, a weighted averaging approach, as indicated at step 110. Such a weighted averaging approach utilizes the weighting values produced, for example, at steps 316 or 406. Generally, the intuition behind such a weighting scheme is to give smaller weighting values to noisier and more aliased blocks. In order to reduce boundary artifacts, a Kaiser window may be applied to each processed image block, X, before combination.

The weighted averaging approach used to generate a final image estimate from thresholded blocks in similarity clusters can be formally described as:

$$m^{(t+1)} = \sum_{(x_0, y_0, z_0)} \frac{\left( \frac{\sum_{l:(x_0,y_0,z_0) \in \Lambda_l} w_l^{filt} \chi_{x_0,y_0,z_0}(F^{-1}(\Phi_{filt}(F(\Lambda_l))))}{\sum_{l:(x_0,y_0,z_0) \in \Lambda_l} w_l^{filt}} \right)}{\sum_{(x_0,y_0,z_0)} I(x_0, y_0, z_0)}; \tag{13}$$

where $\Phi_{filt}$ specifies whether hard thresholding, Wiener filter, principal component pursuit processing, or the like has been used; $w_l^{filt}$ specifies the corresponding weight for the appropriate cluster; $\chi_{x_0,y_0,z_0}$ is a function that keeps the two-dimensional image block, X, whose top left corner is located at $(x_0,y_0,z_0)$ among the blocks in the cluster and maps it to its appropriate location in the image; and $I(x_0,y_0,z_0)$ is the indicator function, which takes a value of one when $\{(x,y,z): x_0 \leq x \leq x_0+N_b-1, y_0 \leq y \leq y_0+N_b-1, z=z_0\}$, and a value of zero otherwise.

A decision is made at decision block 112 whether the produced weighted average image, $m^{(t+1)}$, satisfies a stopping criterion for the image reconstruction. If the produced weighted average image satisfies the stopping criterion, then it is stored as the final target image, as indicated at step 114, and the reconstruction concludes. If not, however, then a data consistency condition is enforced on the weighted average image, as indicated at step 116. For example, the following data consistency condition is enforced:

$$P \cdot m^{(t+1)} = Y \tag{14};$$

where Y is the acquired image data, which may be, for example, k-space data, x-ray projection data, or the like; and P is a system matrix that describes a forward projection operator that relates the image estimate, $m^{(t+1)}$, to the acquired image data, Y. When dealing with computed tomography ("CT") imaging, the system matrix, P, can include a reprojection operation, while in magnetic resonance imaging ("MRI"), it can include a Fourier transform operation. The consistency condition of Eqn. (14) generally provides that when the image estimate, $m^{(t+1)}$, is faithfully reconstructed, the forward operation should substantially represent the actual data acquisition procedure in order to generate a correct estimate of the measured projection data. This consistency condition is enforced, for example, by forward projecting the image estimate into image estimate data, which may then be compared with the acquired image data. For example, the image estimate data may be averaged together with the acquired data to produce updated image data. It will be appreciated by those skilled in the art that other techniques for enforcing the consistency condition may be implemented.

After the consistency condition has been enforced, the next iteration of the reconstruction is selected at step 118 and a decision made at decision block 120 whether the similarity clusters should be updated or further processed without updating. If the similarity clusters are updated first, then steps 106-110 are repeated to produce an updated weighted average image. If, however, the similarity clusters are not to be updated first, then only step 108 and 110 are repeated to produce an updated weighted average image.

Figure 5:
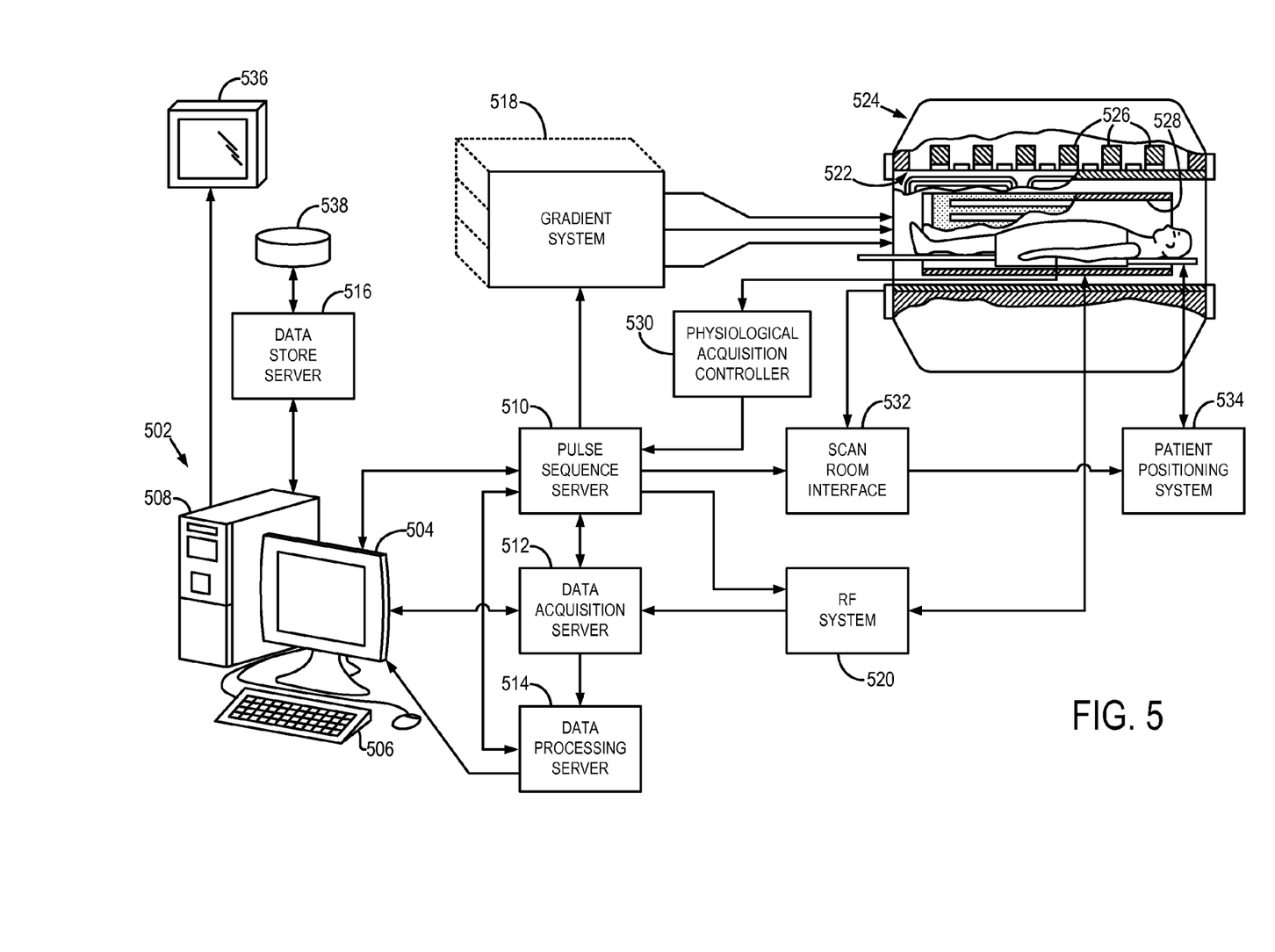
FIG. 5 is a block diagram of an exemplary magnetic resonance imaging ("MRI") system that employs the present invention

Referring particularly now to FIG. 5, an exemplary magnetic resonance imaging ("MRI") system 500 is illustrated. The MRI system 500 includes a workstation 502 having a display 504 and a keyboard 506. The workstation 502 includes a processor 508, such as a commercially available programmable machine running a commercially available operating system. The workstation 502 provides the operator interface that enables scan prescriptions to be entered into the MRI system 500. The workstation 502 is coupled to four servers: a pulse sequence server 510; a data acquisition server 512; a data processing server 514, and a data store server 516. The workstation 502 and each server 510, 512, 514 and 516 are connected to communicate with each other.

The pulse sequence server 510 functions in response to instructions downloaded from the workstation 502 to operate a gradient system 518 and a radiofrequency ("RF") system 520. Gradient waveforms necessary to perform the prescribed scan are produced and applied to the gradient system 518, which excites gradient coils in an assembly 522 to produce the magnetic field gradients $G_x$, $G_y$, and $G_z$ used for position encoding MR signals. The gradient coil assembly 522 forms part of a magnet assembly 524 that includes a polarizing magnet 526 and a whole-body RF coil 528.

RF excitation waveforms are applied to the RF coil 528, or a separate local coil (not shown in FIG. 5), by the RF system 520 to perform the prescribed magnetic resonance pulse sequence. Responsive MR signals detected by the RF coil 528, or a separate local coil (not shown in FIG. 5), are received by the RF system 520, amplified, demodulated, filtered, and digitized under direction of commands produced by the pulse sequence server 510. The RF system 520 includes an RF transmitter for producing a wide variety of RF pulses used in MR pulse sequences. The RF transmitter is responsive to the scan prescription and direction from the pulse sequence server 510 to produce RF pulses of the desired frequency, phase, and pulse amplitude waveform. The generated RF pulses may be applied to the whole body RF coil 528 or to one or more local coils or coil arrays (not shown in FIG. 5).

The RF system 520 also includes one or more RF receiver channels. Each RF receiver channel includes an RF amplifier that amplifies the MR signal received by the coil 528 to which it is connected, and a detector that detects and digitizes the I and Q quadrature components of the received MR signal. The magnitude of the received MR signal may thus be determined at any sampled point by the square root of the sum of the squares of the I and Q components:

$$M=\sqrt{I^2+Q^2} \quad (15);$$

and the phase of the received MR signal may also be determined:

$$\phi = \tan^{-1}\left(\frac{Q}{I}\right). \quad (16)$$

The pulse sequence server 510 also optionally receives patient data from a physiological acquisition controller 530. The controller 530 receives signals from a number of different sensors connected to the patient, such as electrocardiograph ("ECG") signals from electrodes, or respiratory signals from a bellows or other respiratory monitoring device. Such signals are typically used by the pulse sequence server 510 to synchronize, or "gate," the performance of the scan with the subject's heart beat or respiration.

The pulse sequence server 510 also connects to a scan room interface circuit 532 that receives signals from various sensors associated with the condition of the patient and the magnet system. It is also through the scan room interface circuit 532 that a patient positioning system 534 receives commands to move the patient to desired positions during the scan.

The digitized MR signal samples produced by the RF system 520 are received by the data acquisition server 512. The data acquisition server 512 operates in response to instructions downloaded from the workstation 502 to receive the real-time MR data and provide buffer storage, such that no data is lost by data overrun. In some scans, the data acquisition server 512 does little more than pass the acquired MR data to the data processor server 514. However, in scans that require information derived from acquired MR data to control the further performance of the scan, the data acquisition server 512 is programmed to produce such information and convey it to the pulse sequence server 510. For example, during prescans, MR data is acquired and used to calibrate the pulse sequence performed by the pulse sequence server 510. Also, navigator signals may be acquired during a scan and used to adjust the operating parameters of the RF system 520 or the gradient system 518, or to control the view order in which k-space is sampled. The data acquisition server 512 may also be employed to process MR signals used to detect the arrival of contrast agent in a magnetic resonance angiography ("MRA") scan. In all these examples, the data acquisition server 512 acquires MR data and processes it in real-time to produce information that is used to control the scan.

The data processing server 514 receives MR data from the data acquisition server 512 and processes it in accordance with instructions downloaded from the workstation 502. Such processing may include, for example: Fourier transformation of raw k-space MR data to produce two or three-dimensional images; the application of filters to a reconstructed image; the performance of a backprojection image reconstruction of acquired MR data; the generation of functional MR images; and the calculation of motion or flow images.

Images reconstructed by the data processing server 514 are conveyed back to the workstation 502 where they are stored. Real-time images are stored in a data base memory cache (not shown in FIG. 5), from which they may be output to operator display 512 or a display 536 that is located near the magnet assembly 524 for use by attending physicians. Batch mode images or selected real time images are stored in a host database on disc storage 538. When such images have been reconstructed and transferred to storage, the data processing server 514 notifies the data store server 516 on the workstation 502. The workstation 502 may be used by an operator to archive the images, produce films, or send the images via a network to other facilities.

Figure 6A:
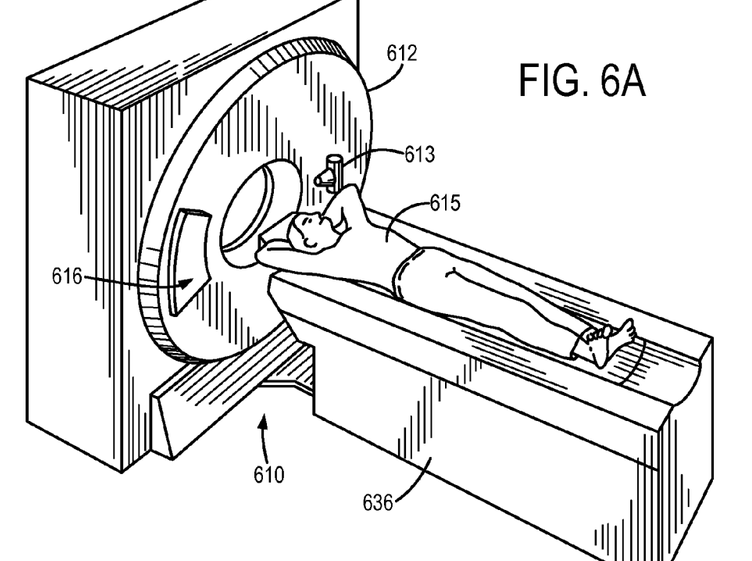
FIG. 6A is a pictorial view of an exemplary x-ray computed tomography ("CT") imaging system.
Figure 6B:
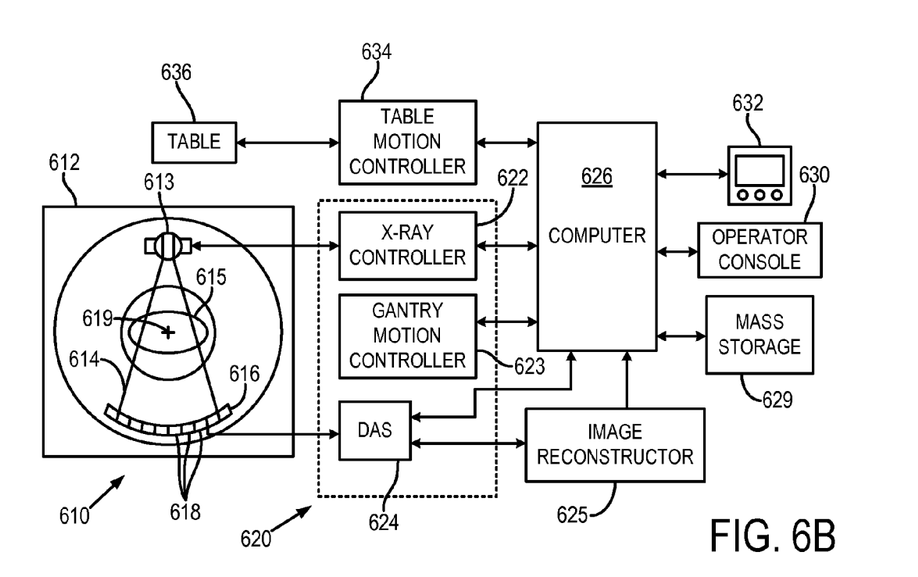
FIG. 6B is a block diagram of the CT imaging system of FIG. 6A.

With initial reference to FIGS. 6A and 6B, an x-ray computed tomography ("CT") imaging system 610 includes a gantry 612 representative of a "third generation" CT scanner. Gantry 612 has an x-ray source 613 that projects a fan-beam, or cone-beam, of x-rays 614 toward a detector array 616 on the opposite side of the gantry. The detector array 616 is formed by a number of detector elements 618 which together sense the projected x-rays that pass through a medical patient 615. Each detector element 618 produces an electrical signal that represents the intensity of an impinging x-ray beam and hence the attenuation of the beam as it passes through the patient. During a scan to acquire x-ray projection data, the gantry 612 and the components mounted thereon rotate about a center of rotation 619 located within the patient 615.

The rotation of the gantry and the operation of the x-ray source 613 are governed by a control mechanism 620 of the CT system. The control mechanism 620 includes an x-ray controller 622 that provides power and timing signals to the x-ray source 613 and a gantry motor controller 623 that controls the rotational speed and position of the gantry 612. A data acquisition system ("DAS") 624 in the control mechanism 620 samples analog data from detector elements 618 and converts the data to digital signals for subsequent processing. An image reconstructor 625, receives sampled and digitized x-ray data from the DAS 624 and performs high speed image reconstruction. The reconstructed image is applied as an input to a computer 626 which stores the image in a mass storage device 628.

The computer 626 also receives commands and scanning parameters from an operator via console 630 that has a keyboard. An associated display 632 allows the operator to observe the reconstructed image and other data from the computer 626. The operator supplied commands and parameters are used by the computer 626 to provide control signals and information to the DAS 624, the x-ray controller 622 and the gantry motor controller 623. In addition, computer 626 operates a table motor controller 634 which controls a motorized table 636 to position the patient 615 in the gantry 612.

The present invention has been described in terms of one or more preferred embodiments, and it should be appreciated that many equivalents, alternatives, variations, and modifications, aside from those expressly stated, are possible and within the scope of the invention.

We claim:

1. A method for iteratively reconstructing an image of a subject from undersampled image data, the steps of the method comprising:
   a) acquiring, with an imaging system, undersampled image data from a subject;
   b) reconstructing from the acquired undersampled image data, an image of the subject;
   c) producing from the image of the subject, a number of similarity clusters;
   d) iteratively reconstructing a target image of the subject by:
      i) processing the similarity clusters;
      ii) producing a number of weighting values that are related to the processing used in step i);
      iii) producing an estimate image of the subject by combining the processed similarity clusters using the number of weighting values;
      iv) evaluating a stopping criterion;
      v) storing the estimate image of the subject as a target image of the subject when the stopping criterion is satisfied and when the stopping criterion is not satisfied:
         updating the estimate image by enforcing a consistency condition on the estimate image by forward projecting the estimate image into estimate image data, forming combined data by combining the estimate image data with the undersampled image data acquired in step a), and reconstructing the updated estimate image from the combined data; and
      repeating steps i)-iv) until the stopping criterion is satisfied;
   whereby the target image of the subject is substantially free of artifacts attributable to aliasing and noise.

2. The method as recited in claim 1 in which the image reconstructed in step b) is a low resolution image reconstructed from a subset of the acquired image data such that the low resolution image has a lower resolution than an image reconstructed using all of the acquired image data, and in which the target image reconstructed in step c) has a higher resolution than the image reconstructed in step b).

3. The method as recited in claim 1 in which the image reconstructed in step b) is an estimate image produced from a portion of the undersampled image data.

4. The method as recited in claim 1 in which the estimate image produced in step d)iii) is produced using a weighted average.

5. The method as recited in claim 1 in which the imaging system is at least one of a magnetic resonance imaging system and an x-ray computed tomography imaging system.

6. The method as recited in claim 1 in which step d)i) includes arranging the similarity clusters in a three-dimensional matrix and applying a transform to the produced matrix in order to produce transform coefficients.

7. The method as recited in claim 6 in which the applied transform is a Fourier transform.

8. The method as recited in claim 6 in which step d)i) further includes filtering the transform coefficients using at least one of hard thresholding and Wiener filtering.

9. The method as recited in claim 8 in which step d)ii) includes applying an inverse transform to the filtered transform coefficients.

10. The method as recited in claim 1 in which step d)i) includes forming a cluster matrix using the similarity clusters and recovering a low-rank matrix from the cluster matrix.

11. The method as recited in claim 10 in which the low-rank matrix is recovered by rank-minimizing the cluster matrix.

12. The method as recited in claim 11 in which rank-minimization of the cluster matrix includes minimizing an objective function that includes terms that model noise and artifacts in the similarity clusters.

13. The method as recited in claim 11 in which rank-minimization of the cluster matrix is performed using at least one of a principal component analysis and a principal component pursuit technique.

14. The method as recited in claim 1 in which when the stopping criterion is not satisfied, step c)v) further comprises updating the similarity clusters by producing similarity clusters from the updated estimate image and replacing the previously produced similarity clusters with the similarity clusters produced from the updated estimate image.

* * * * *